(12) United States Patent
Zellweger et al.

(10) Patent No.: US 6,385,438 B1
(45) Date of Patent: May 7, 2002

(54) ANTENNA ARRANGEMENT

(75) Inventors: Emil Zellweger, Lommiswil; Urs Lott, Zürich, both of (CH); Jakob Kucera, München (DE)

(73) Assignee: Asulab S.A., Bienne (CH)

( * ) Notice: Subject to any disclaimer, the term of this patent is extended or adjusted under 35 U.S.C. 154(b) by 0 days.

(21) Appl. No.: 09/523,756

(22) Filed: Mar. 13, 2000

(30) Foreign Application Priority Data

Mar. 19, 1999 (EP) ............................................ 99105663

(51) Int. Cl.[7] ................................................. H04B 1/44
(52) U.S. Cl. ............................... 455/78; 455/80; 455/83
(58) Field of Search ............................. 455/78, 80, 83, 455/115, 127; 333/101–104

(56) References Cited

U.S. PATENT DOCUMENTS

| | | | | |
|---|---|---|---|---|
| 5,193,218 A | * | 3/1993 | Shimo | 455/80 |
| 5,590,412 A | * | 12/1996 | Sawai et al. | 455/82 |
| 5,678,199 A | * | 10/1997 | Birth et al. | 455/80 |
| 5,784,687 A | * | 7/1998 | Itoh et al. | 455/78 |
| 5,909,641 A | * | 6/1999 | Simmons | 455/78 |
| 5,999,523 A | * | 12/1999 | Murtojarvi | 370/345 |

FOREIGN PATENT DOCUMENTS

| | | | | |
|---|---|---|---|---|
| EP | 0 714 177 | 5/1996 | | 455/78 |
| EP | 0 878 918 | 11/1998 | | 455/80 |

* cited by examiner

*Primary Examiner*—Daniel Hunter
*Assistant Examiner*—Tuan Tran
(74) *Attorney, Agent, or Firm*—Sughrue Mion, PLLC

(57) ABSTRACT

The present invention concerns an antenna arrangement (29) including: an antenna (A) able to transmit data in the form of a radiofrequency signal; a transmitter (32) including a preamplifier (33) and a first transistor (36) connected in cascade, this transmitter being able to provide a radiofrequency signal containing the data to be transmitted to the antenna; and coupling means (30) connected between the antenna and the transmitter, and including a phase lag circuit (42) able to achieve the coupling of the antenna and the transmitter. The coupling means further include switching means (43) connected between the system's earth and the source terminal of the first transistor of the transmitter, so as to be able to switch the latter to an ON state, respectively to an OFF state, when said antenna is, respectively is not, in transmission phase.

15 Claims, 7 Drawing Sheets

ANTENNA ARRANGEMENT

The present invention concerns the technical field of antenna arrangements.

Conventionally, an antenna arrangement including an antenna, a receiver and a transmitter, able to couple the antenna alternately to the transmitter (in transmission phase) and to the receiver (in reception phase), is used.

One problem encountered in such an antenna arrangement is achieving an optimum coupling between the transmitter and the antenna.

With reference to FIG. 1A of the present description, GB Patent No. 2,323,799 of Motorola Israel discloses an antenna arrangement 10 including an antenna A, a transmitter (the latter including at its output a power amplifier 16), and means 18 for coupling antenna A and the transmitter.

Coupling means 18 are formed by a transmission line able to transform the output impedance of amplifier 16, as is described in more detail hereinafter. It will be noted that line 18 operates like a phase lag circuit.

It is to be noted that line 18 allows the transmitter to be isolated from antenna A, in the event that the latter is not in transmission phase (in particular in reception phase). In such case, power amplifier 16 is controlled so as to no longer provide a signal, and its output impedance is then of a highly reactive nature. Line 18 is thus arranged so that the impedance seen from antenna A to the transmitter corresponds to that of an open circuit (high impedance). In other words, the transmitter is insulated from antenna A, and a radiofrequency signal received by antenna A is provided to the receiver.

One drawback of the arrangement of antenna 10 is that it includes transmission lines, which involves a considerable space requirement for this arrangement.

Another drawback of the arrangement of antenna 10 is that it requires making an additional circuit able to control power amplifier 16, which is counter to the usual industrial concerns as to limiting space requirement, weight, electric power consumption and thus the cost of manufacturing and use.

With reference to FIG. 1B of the present description, the document <<Drain supply switching of mobile phone power amps with pulsed operation mode>>, Siemens Application Note No. 009, Discrete and RF semiconductor division, Edition A03, describes a control circuit 23 including control means 25 and a field effect transistor 28 (of P type channel). Transistor 28 is connected between a supply terminal (for receiving supply voltage Vb) and the system's earth, via supply terminals of power amplifier 16. Transistor 28 is controlled by control means 25 so that, when antenna A is in transmission phase, amplifier 16 can provided a sufficiently powerful radiofrequency signal (RF) from the transmitter to antenna A, with a minimum of electric power loss.

Moreover, the Applicant of the present invention has observed that, when antenna A is in transmission phase, the provision of the radiofrequency signal is not optimum, from the point of view of electric power losses, and that, when antenna A is not in transmission phase, the isolation of the transmitter and antenna A is not optimum, since the output impedance of amplifier 16 can vary.

One object of the present invention is to provide an antenna arrangement including an antenna and a transmitter, this arrangement overcoming the aforementioned drawbacks, to provide optimum coupling between the transmitter and the antenna, i.e. coupling causing a minimum of electric power losses RF.

Another object of the present invention is to provide an antenna arrangement able to provide control of the power amplifier of the transmitter, without resorting to additional components (for example a field effect transistor of P type channel).

Another object of the present invention is to provide an antenna arrangement answering the criteria of minimum complexity, low power consumption, compactness and low cost, which are conventional in telecommunications.

These objects, in addition to others, are achieved by the antenna arrangement according to claim 1.

These objects and features of the present invention, in addition to others, will appear more clearly upon reading the detailed description of four embodiments of the invention, given solely by way of example, with reference to the annexed drawings, in which:

FIG. 1A, cited above, shows an antenna arrangement according to the prior art;

FIG. 1B, cited above, shows a conventional control circuit able to be fitted to the antenna arrangement of FIG. 1A;

Figure 1A:
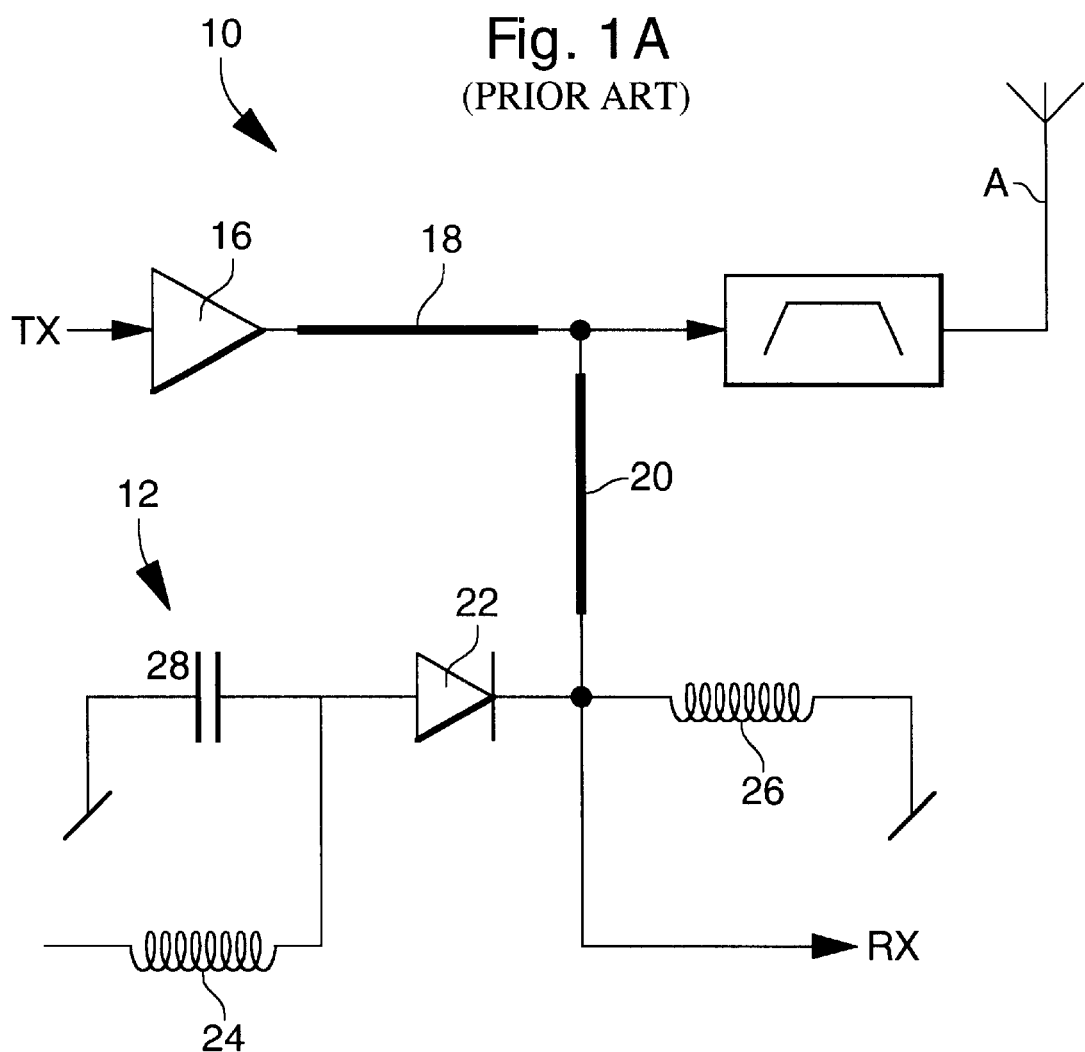
Figure 1B:
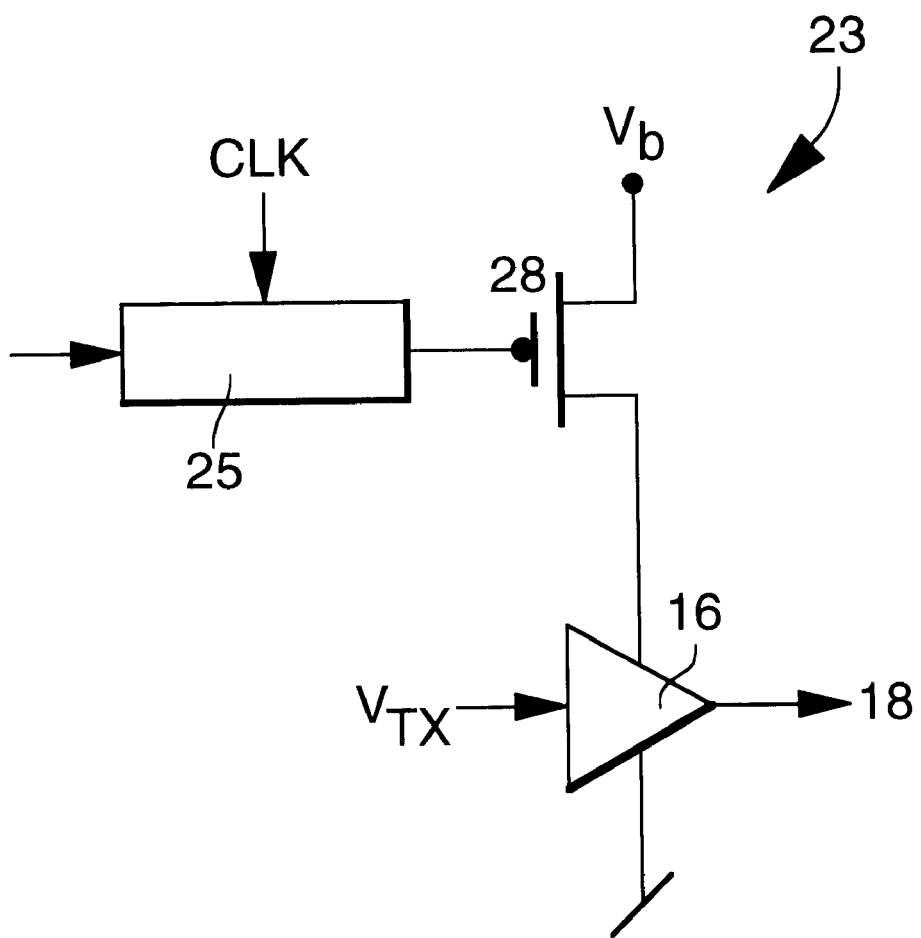
Figure 2:
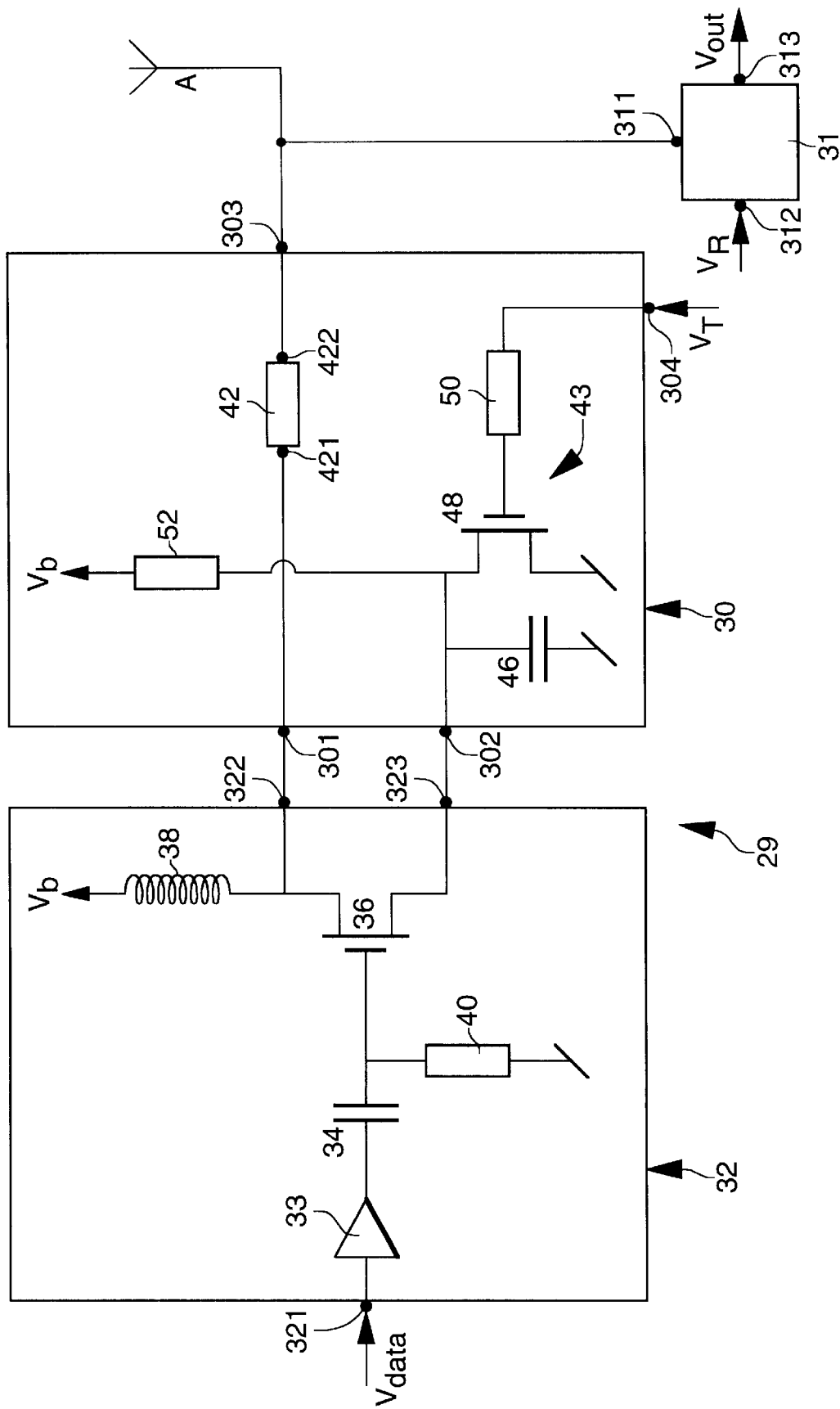
FIG. 2 shows a preferred embodiment of an antenna arrangement according to the present invention including an antenna, a receiver, a transmitter and coupling means.

With reference to FIG. 2, an antenna arrangement 29 includes an antenna A, a transmitter 32 and coupling means 30. Antenna arrangement 29 can also include a receiver 31; however, those skilled in the art will note that the embodiment of receiver 31 is independent of the coupling between transmitter 32 and antenna A, i.e. of the operation of coupling means 30.

Transmitter 32 includes an input terminal 321 connected to a processing unit (not shown in FIG. 2), to be able to receive an electric voltage $V_{data}$ which typically represents data which antenna A has to transmit in transmission phase. Transmitter 32 also includes two connection terminals 322 and 323 connected to coupling means 30, as is described hereinafter.

Transmitter 32 is arranged to provide a sufficiently powerful radiofrequency signal RF to antenna A. For this purpose, transmitter 32 includes a preamplifier 33, a capacitor 34, an inductor 38, a high impedance 40 and a field effect transistor 36 (which is of N type channel, in this example).

Preamplifier 33 is connected in cascade with transistor 36. The gate terminal of transistor 36 is connected to the system's earth, via high impedance 40, as well as to terminal 321 of transmitter 32, via preamplifier 33 of and capacitor 34. The drain terminal of transistor 36 is connected to terminal 322 of transmitter 32, as well as to a supply terminal, via inductor 38 to receive a supply voltage Vb. And the source terminal of transistor 36 is connected to terminal 323 of transmitter 32.

Capacitor 34 allows the signal originating from preamplifier 33 to be filtered, to provide a radiofrequency signal (the latter controlling transistor 36).

Receiver 31 includes an input terminal 311 connected to antenna A, so as to be able to receive the data which antenna A receives in reception phase, and an output terminal 313 so as to be able to provide a voltage Vout containing the received data. Receiver 31 also includes a control terminal 312 connected to first control means (not shown in FIG. 2), to receive an electric voltage $V_R$ able to control the coupling of receiver 31 and antenna A. The first control means can be formed by the processing unit connected to transmitter 32.

Receiver 31 is arranged to be coupled to antenna A when the latter is in reception phase, and to be protected from transmitter 32, when antenna A is not in reception phase.

Solely by way of illustration, an embodiment of receiver 31 will be described, with reference to FIG. 3 which shows three capacitors 62, 64 and 69, three high impedances 66, 67 and 68, a low noise amplifier 72 and a field effect transistor 70 (which is of N type channel in this example). It will be noted that the elements in FIG. 3 which are identical to those described in relation to FIG. 2 have been designated by the same references.

Figure 3:
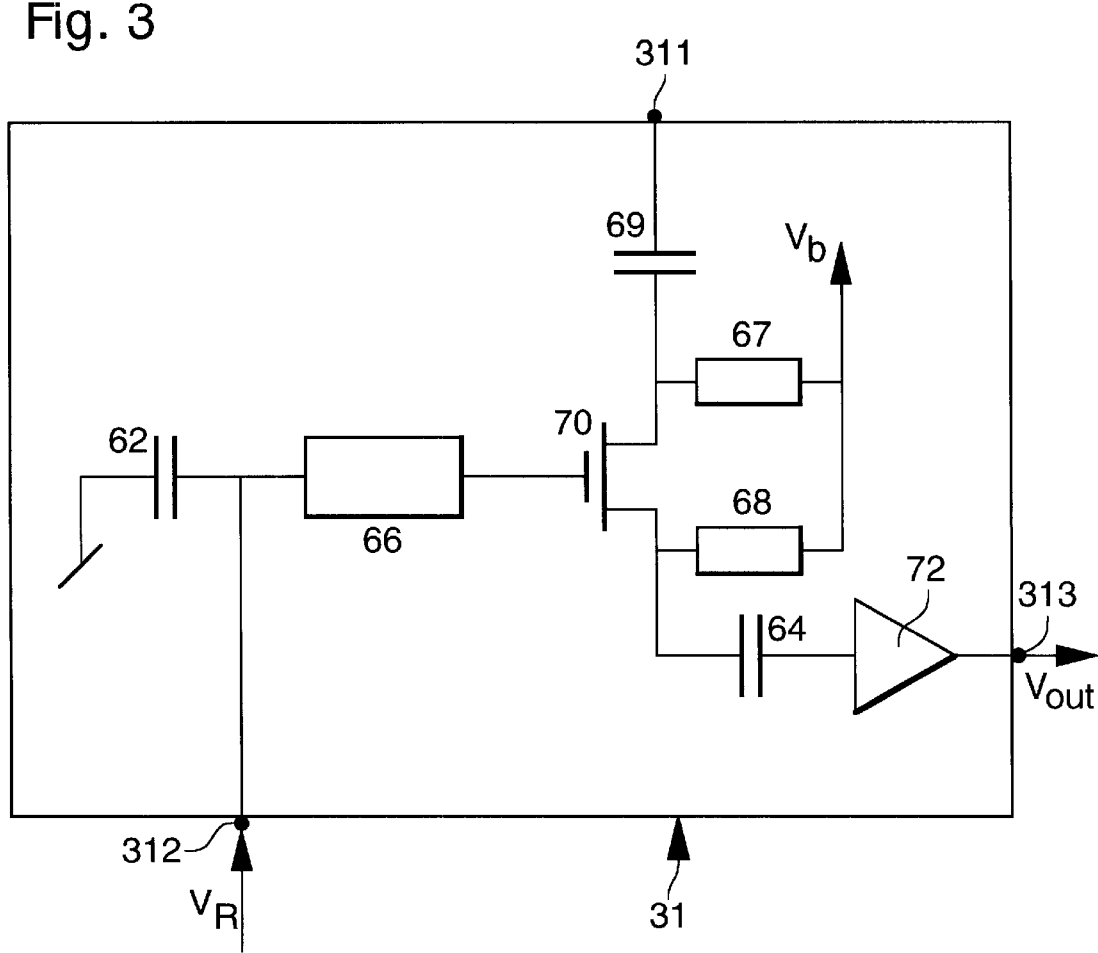
FIG. 3 shows an embodiment of the receiver of FIG. 2.

As FIG. 3 shows, amplifier 72, capacitor 69, transistor 70 and capacitor 64 are connected in series across input terminal 311 and output terminal 313. The gate terminal of transistor 70 is connected to control terminal 312 via resistor 66, and the drain and source terminals of this transistor are connected, via respective high impedances 67 and 68, to a power supply terminal able to receive supply voltage Vb. Capacitor 62 is connected across control terminal 312 and the system's earth. In the example shown in FIG. 3, electric voltage VR is equal to a high state or <<1>> (respectively to a low state or <<0>>), when the antenna has (or respectively does not have) to be connected to amplifier 72, i.e. to be (or respectively not to be) in reception phase. Thus, when antenna A is not in reception phase (in particular when it is in transmission phase), receiver 31 is isolated from transmitter 32. This assures the protection of the receiver as regards the radiofrequency signal provided by transmitter 32 to antenna A.

With reference again to FIG. 2, coupling means 30 include a control terminal 304 connected to second control means (not shown in FIG. 2), to be able to receive an electric voltage $V_T$ able to control the coupling of transmitter 32 and antenna A. It will be noted that the second control means may be formed by the processing unit connected to receiver 31 and, in such case, that $V_T = V_R$.

In the case of the example shown in FIG. 2, electric voltage $V_T$ is equal to a high state or <<1>> (respectively to a low state or <<0>>) when antenna A has (respectively does not have) to be in transmission phase. Coupling means 30 also includes two connection terminals 301 and 302 connected respectively to terminals 322 and 323 of transmitter 32 and an output terminal 303 connected to antenna A.

Coupling means 30 include a phase lag circuit 42 able to perform the coupling of antenna A and transmitter 32, and switching means 43 able to control the state of transistor 36, so that the latter is in an ON-state (respectively an OFF-state) when antenna A is (respectively is not) in transmission phase. For this purpose, switching circuit 43 includes a capacitor 46, two resistors 50 and 52 and a field effect transistor 48 (which is of N type channel in this example).

Essentially, the state of transistor 48 controls the state of transistor 36, so that, when transistor 48 is at an ON-state (respectively in an OFF-state), transistor 36 is in the ON-state (respectively an OFF-state). For this purpose, the gate terminal of transistor 48 is connected to terminal 304 of coupling means 30 via resistor 50, to be able to receive voltage $V_T$ which controls the switching of transistor 48 to the ON or OFF state. It will be noted that, when voltage $V_T$ equals <<0>> (respectively <<1>>), transistor 48 is in the OFF state (respectively the ON state). The source terminal of transistor 48 is connected to the earth of the system. The drain terminal is connected to terminal 302 of coupling means 30, as well as to a power supply terminal via resistor 52, to be able to receive supply voltage Vb. It will be noted that the value of resistor 52 is preferably high.

Capacitor 46 is connected across terminal 302 of coupling means 30 and the system's earth, i.e. it is connected in parallel with the drain and source terminals of transistor 48. Those skilled in the art will note that capacitor 46 has the advantage of allowing RF current charges originating from transmitter 32 to flow to earth, when antenna A is in transmission phase. This prevents such charges flowing through transistor 46.

Phase lag circuit 42 includes two terminals 421 and 422 respectively connected to terminals 301 and 303 of coupling means 30. Phase lag circuit 42 is arranged so that the impedance seen from antenna A to transmitter 32 corresponds to the impedance matching when antenna A is in transmission phase and to that of an open circuit (high impedance) when antenna A is not in transmission phase. For this purpose, and with reference to FIG. 4, phase lag circuit 42 is preferably made of an inductance 55 and two capacitors 54 and 56. It will be noted that the elements in FIG. 4 which are identical to those described in relation to FIG. 2 have been designated by the same references.

Figure 4:
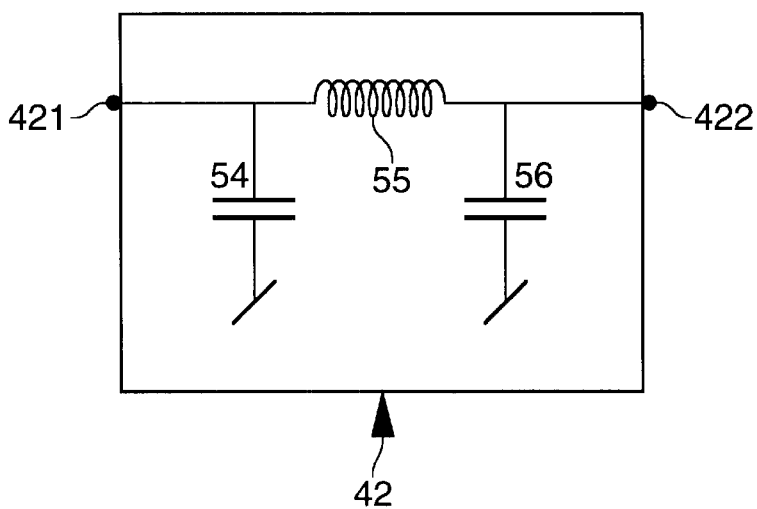
FIG. 4 shows a circuit of the coupling means of FIG. 2.

As FIG. 4 shows, inductor 55 is connected between terminals 421 and 422 of the circuit. Capacitor 54 is connected across terminal 421 of this circuit and the system's earth. And capacitor 56 is connected between terminal 422 of this circuit and the system's earth.

Those skilled in the art will note that coupling means 30, transmitter 32 and receiver 31 can be made monolithically in a single substrate, and that antenna A can also be made monolithically in such substrate.

One advantage of making coupling means 30 and transmitter 32 is to make an integrated structure suitable for communication devices, thanks to its compactness, low electric power consumption and thus its cost.

Another advantage of such an integrated embodiment is that transmission lines are not included, the latter being cumbersome structure to make on a semiconductor substrate.

The operation of coupling means 30 in antenna arrangement 29 will now be described, when antenna A is (or is not) in transmission phase, with reference to FIG. 2.

Let us consider the case in which antenna A is in transmission phase. Coupling means 30 receive voltage $V_T$ with a value <<1>>, which causes transistor 48 to conduct. As a result, the source terminal of transistor 36 is connected to the system's earth, via the resistance present across the source and drain terminals of transistor 48. Thus, transistor 36 is in the ON state, and voltage $V_{data}$ containing the data to be transmitted controls transistor 36, i.e. the supply of such data to antenna A.

Those skilled in the art will note that transistor 48 can be controlled by a voltage ramp, so that the RF power has the shape of a ramp, which is necessary in particular for so called TDMA (Time Division Multiple Access) applications.

Let us now consider the case in which antenna A is not in transmission phase (this case covering in particular the situation in which antenna A is in reception phase).

Coupling means 30 receives voltage $V_T$ with a value <<0>> which causes transistor 48 to be non conductive. As a result the source terminal of transistor 36 is connected to the power supply terminal, via resistor 52 so that the electric voltage present at this terminal is substantially equal to that present at the drain terminal of transistor 36. Moreover, the gate terminal of the latter is connected to the system's earth, via impedance 40, so that the electric voltage present across the gate terminal and the source terminal is substantially lower than the threshold voltage of transistor 36, which causes it to be non conductive. Transistor 36 then has a high output impedance. Thus the impedance present at terminal 421 of phase lag circuit 42 is high, and the impedance seen from antenna A to transmitter 32 (i.e. to terminal 303) corresponds to that of an open circuit. Thus, in reception phase, the data received by antenna A are provided to terminal 311 of receiver 31 only.

One advantage of coupling means 30 is that, in transmission phase, the supply of the radiofrequency signal from transmitter 32 to antenna A can be controlled, without causing any electric power losses. When antenna A has to be in transmission phase, transistor 48 is in the ON state, which connects the source terminal of transistor 36 to the system's earth. As a result, the electric power losses are considerably reduced, when transistor 36 provides the data that antenna A has to transmit. This achieves an optimum coupling (i.e. with a minimum of electric power losses) between the transmitter and the antenna when the latter is in transmission phase.

Another advantage of such coupling means is to block the output transistor of the power amplifier of the transmitter, when antenna A is not in transmission phase. As a result, the impedance seen from antenna A to transmitter 32 ideally corresponds to that of an open circuit (high impedance), which isolates the transmitter from the antenna perfectly, when the latter is not in transmission phase. In other words, this forms optimum isolation between the transmitter and the antenna, when the latter is not in transmission phase.

One advantage of coupling means 30 is that the coupling of transmitter 32 and antenna A can be controlled when the latter has (respectively does not have) to be in transmission phase, while commanding the supply of the radiofrequency signal to be transmitted, via transistor 36, and without resorting to additional components.

It goes without saying for those skilled in the art that the detailed description hereinabove can undergo various modifications, variants and improvements without departing from the scope of the present invention.

By way of alternative embodiment, phase lag circuit 42 can be formed by a transmission line of the quarter-wave type.

Also by way of alternative embodiment, transistors 36, 48 and 33 can be formed by bipolar transistors, and voltage source 74 is then replaced by a current source, i.e. by a generator able to supply a constant signal so that the transistor is in the ON state.

By way of improvement, transistor 48 is made to have an N type channel, which has the advantage that, when the transistor is in the ON state, the resistance present across its drain and source terminals is not high (compared to that of a field effect transistor of P type channel connected to the power supply terminal). Thus the electric potential present at the source terminal of transistor 36 is substantially equal to that of the system's earth.

Figure 5:
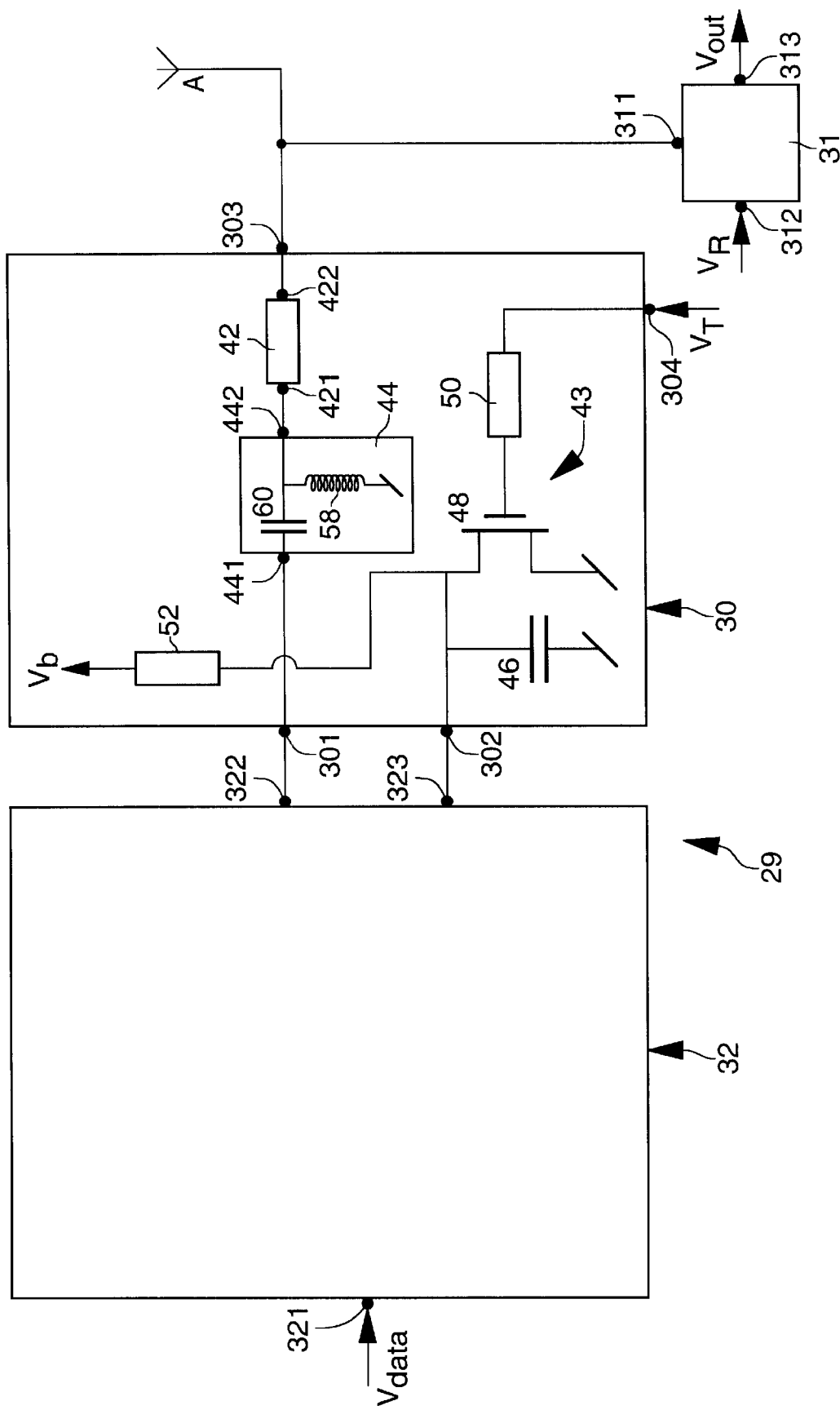
FIG. 5 shows a first improvement of the antenna arrangement of FIG. 2.

Also by way of improvement, coupling means 30 can further include adjustment means 44 connected between phase lag circuit 42 and transmitter 32. It will be noted that the elements in FIG. 5 which are similar to those described in relation to FIG. 2 have been designated by the same references. Adjustment means 44 include an inductor 58 and a capacitor 60. Capacitor 60 is connected between phase lag circuit 42 and transmitter T, and inductance 58 is connected, on the one hand, to capacitor 60 and to phase lag circuit 42 and, on the other hand, to the system's earth. Inductor 58 and capacitor 60 are formed so as to optimise the transfer of RF energy across terminals 322 of transmitter 32 and terminal 303 of coupling means 30 (i.e. to minimise the RF power losses), when antenna A is not in transmission phase.

One advantage of adjustment means 44 is that parameter variations of phase lag circuit 42 connected to the manufacture thereof are overcome, so that the impedance seen from antenna A to transmitter 32 (i.e. to terminal 303) corresponds perfectly to that of an open circuit (high impedance) when antenna A is not in transmission phase (in particular when it is in reception phase).

Figure 6:
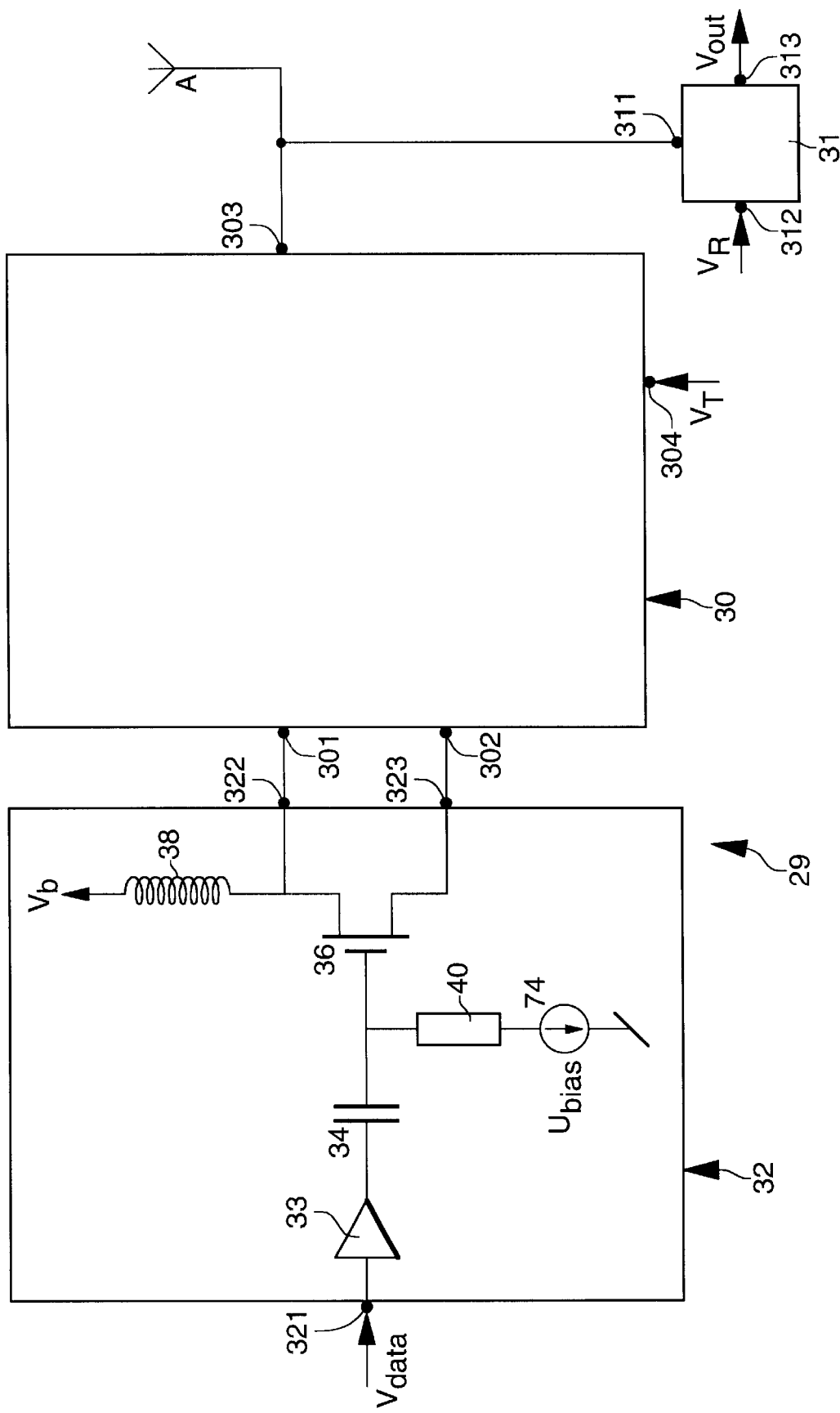
FIG. 6 shows a second improvement of the antenna arrangement of FIG. 2.

Also by way of improvement, transmitter 32 can further include a voltage source 74 connected in series between high impedance 40 and the system's earth. It will be noted that the elements in FIG. 6 which are similar to those described in relation to FIG. 2 have been designated by the same references. Source 74 is arranged so as to be able to provide a constant electric voltage Ubias, so that the electric voltage present across the gate terminal of transistor 36 and the system's earth is higher than the threshold voltage Vth of such transistor. Thus, the constant value of electric voltage Vbias depends on threshold voltage Vth and, for example, is equal to a high voltage level if threshold voltage Vth is high.

One advantage of the arrangement of source 74 is that it assures that transistor 36 conducts in transmission phase, i.e. that the radiofrequency signal is provided to antenna A.

Figure 7:
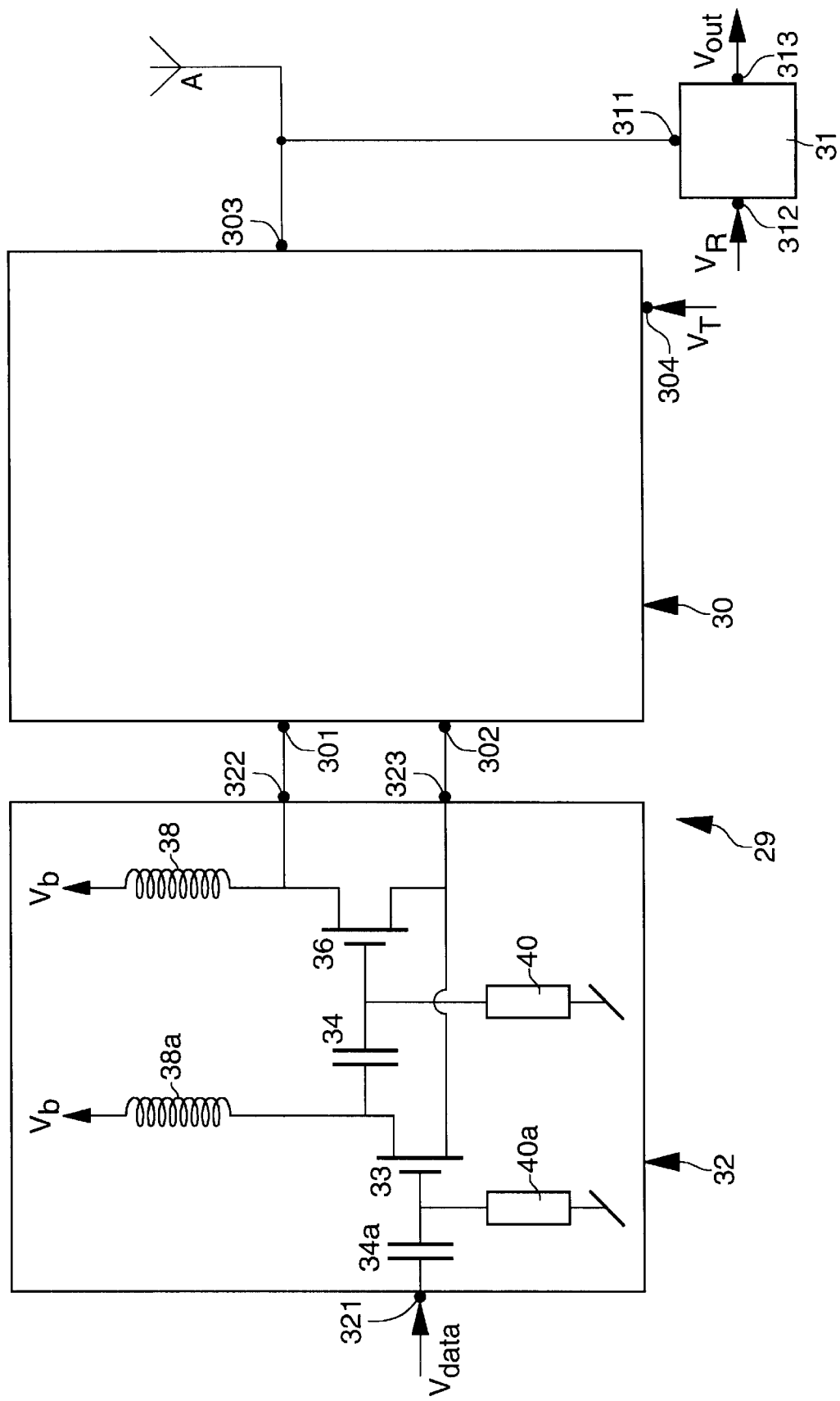
FIG. 7 shows a third improvement of the antenna arrangement of FIG. 2.

Also by way of improvement, transistor 48 of coupling means 30 can also control preamplifier 33, i.e. in the event that the latter is formed by a field effect transistor, the switching of the transistor to an OFF state or to an ON state. For this purpose, transmitter 32 can further include an inductor 38a, a high impedance 40a and a capacitor 34a, these components being arranged so that switching means 43 can switch preamplifier 33 to an activated state, respectively to a deactivated state, when said antenna A is, respectively is not, in transmission phase. It will be noted that the elements in FIG. 7 which are similar to those described in relation to FIG. 2 have been designated by the same references. The transistor forming preamplifier 33 (which has a N type channel, in this example) has a gate terminal connected to terminal 321 via capacitor 34a, as well as to the system's earth via high impedance 40a, a source terminal connected to that of transistor 36, and a drain terminal connected to capacitor 34, as well as to a power supply terminal via inductor 38a. Those skilled in the art will note that, in this improved embodiment, capacitor 46 of the coupling means is arranged in proximity to transistor 36 and preamplifier 33.

One advantage of such an arrangement of antenna 29 is that preamplifier 33 and transistor 36 can be controlled at the same time. This prevents unnecessary electric power consumption by preamplifier 33 when antenna A is not in transmission phase. It will further be noted that such control of preamplifier 33 can be achieved without resorting to an additional control circuit.

What is claimed is:

1. An antenna arrangement including:
   an antenna able to transmit data in the form of a radiofrequency signal;
   a transmitter including a preamplifier and a first transistor connected in cascade, this transmitter being able to provide a radiofrequency signal containing said data to be transmitted to said antenna; and
   coupling means connected across said antenna and said transmitter, and including a phase lag circuit able to achieve the coupling of said antenna and said transmitter, this arrangement wherein said coupling means further include switching means connected across the system's earth and the source terminal of said first transistor, so as to be able to switch the latter to an ON state, respectively to an OFF state, when said antenna is, respectively is not, in transmission phase.

2. An antenna arrangement according to claim 1, wherein said first transistor is formed by a field effect transistor having an N type conductivity channel.

3. An antenna arrangement according to claim 1, wherein said switching means include:

a second transistor able to be controlled by a first control signal representative of the fact that said antenna is, or respectively is not, in transmission phase and, in response, to be in an ON state, respectively an OFF state, so that said first transistor is itself in the ON state, respectively the OFF state;

a first capacitor connected in parallel across the drain and source terminals of said second transistor;

a first resistor connected, on the one hand, to the node of connection across said first capacitor and said second transistor and, on the other hand, to a power supply terminal.

4. An antenna arrangement according to claim 1, wherein said second transistor is formed by a field effect transistor having a N type conductivity channel.

5. An antenna arrangement according to claim 1, wherein said phase lag circuit includes a first inductor and second and third capacitors.

6. An antenna arrangement according to claim 1, wherein said coupling means further include adjustment means connected in series across said transmitter and said phase lag circuit.

7. An antenna arrangement according to claim 6, wherein said adjustment means include a fourth capacitor and a second inductor.

8. An antenna arrangement according to claim 1, wherein said transmitter further includes:

a fifth capacitor connected in series across said preamplifier and said first transistor;

a first high impedance connected between the system's earth and the node of connection of said first transistor and second power amplifier; and a third inductor in series with said first transistor across a power supply terminal and the system's earth.

9. An antenna arrangement according to claim 8, wherein said transmitter further includes a generator connected in series across said first high impedance and the system's earth, this generator being able to provide a constant signal so that said first transistor is in the ON state.

10. An antenna arrangement according to claim 8, wherein said transmitter further includes a fourth inductor, a second high impedance and a sixth capacitor, these components being arranged so that said switching means can switch said preamplifier to an activated state, respectively a deactivated state, when said antenna is, respectively is not, in transmission phase.

11. An antenna arrangement according to claim 10, wherein said preamplifier is formed by a third transistor being able to be in an ON state, respectively in an OFF state, when said second transistor is itself in the ON state, respectively in the OFF state.

12. An antenna arrangement according to claim 1, wherein said third transistor is formed by a field effect transistor having a N type conductivity channel.

13. An antenna arrangement according to claim 1, wherein it further includes a receiver able to be coupled to said antenna when the latter is in reception phase, and to be protected from said transmitter when the latter is not in reception phase; and wherein said receiver is connected across said coupling means and said antenna so that, when the latter is not coupled to said transmitter, the latter is isolated from said receiver, which assures optimum coupling across said antenna and said receiver.

14. An antenna arrangement according to claim 1, wherein said transmitter and said coupling means are made in a monolithic manner in a single semiconductor substrate.

15. An antenna arrangement according to claim 14, wherein said antenna and/or said receiver are made in a monolithic manner in said semiconductor substrate.

* * * * *